(No Model.) 2 Sheets—Sheet 1.
H. W. MORGAN.
BOX NAILING MACHINE.
No. 556,430. Patented Mar. 17, 1896.
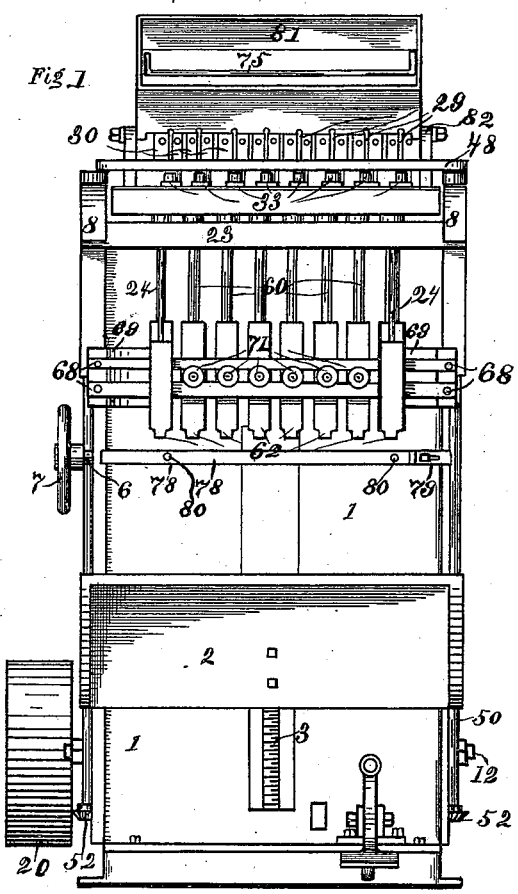
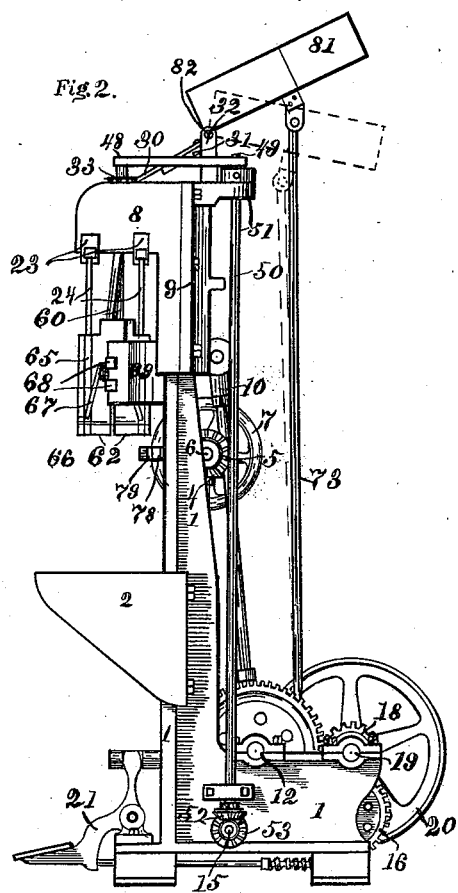
Witnesses
Thomas Durant
Wallace Murdock
Inventor
Henry W. Morgan
by Crunch & Crunch
his attys

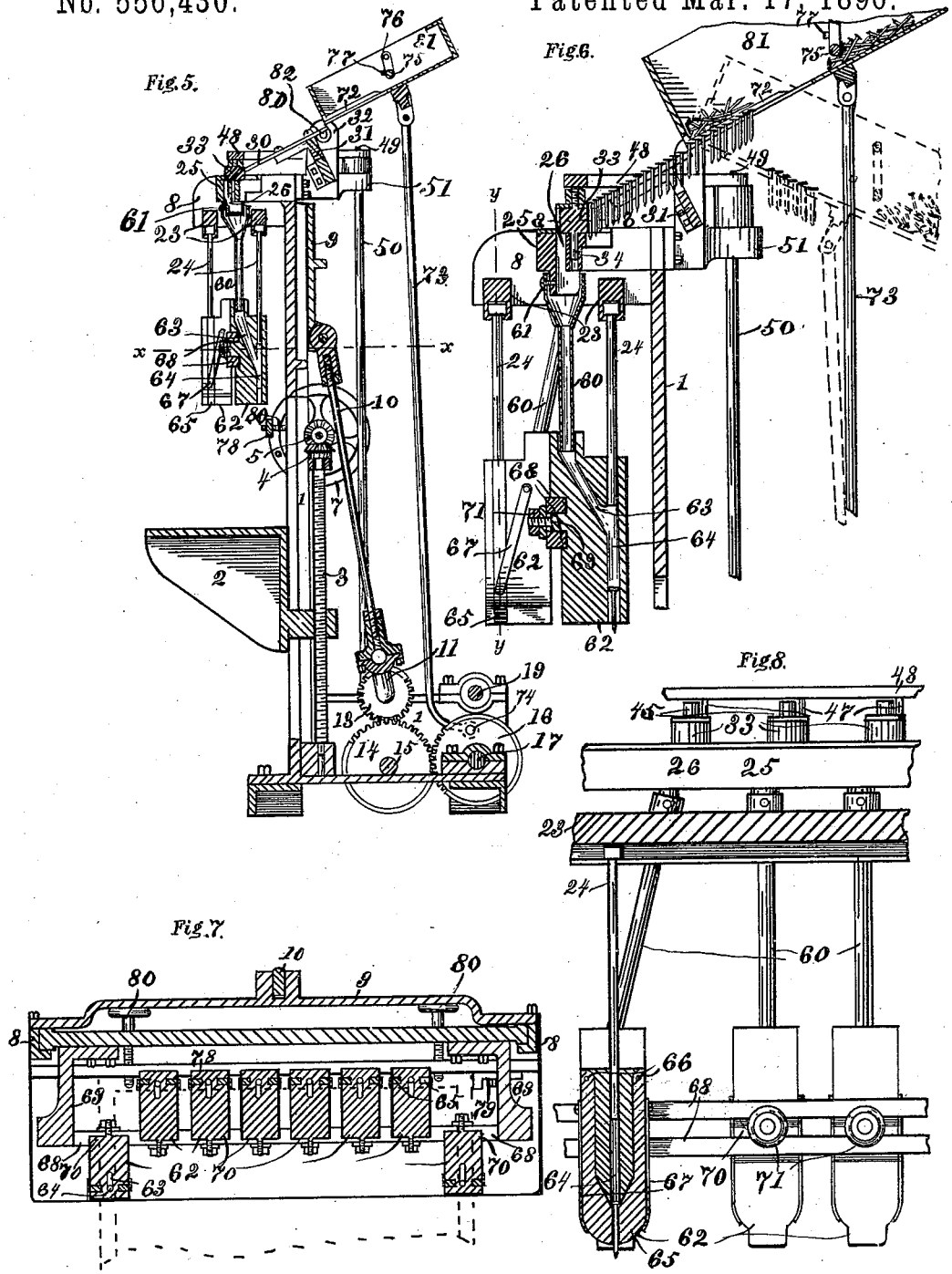

UNITED STATES PATENT OFFICE.

HENRY W. MORGAN, OF ROCHESTER, NEW YORK, ASSIGNOR TO THE MACHINERY CONSTRUCTION COMPANY, OF SAME PLACE.

BOX-NAILING MACHINE.

SPECIFICATION forming part of Letters Patent No. 556,430, dated March 17, 1896.

Application filed April 12, 1895. Serial No. 545,544. (No model.)

*To all whom it may concern:*

Be it known that I, HENRY W. MORGAN, of Rochester, in the county of Monroe and State of New York, have invented certain new and useful Improvements in Box-Nailing Machines; and I do hereby declare the following to be a full, clear, and exact description of the same, reference being had to the accompanying drawings, forming a part of this specification, and to the reference-numerals marked thereon.

My present invention has for its object to provide an improved machine for nailing boxes; and it consists in certain improvements and combinations of parts, all as will be hereinafter fully described and the novel features pointed out particularly in the claims at the end of this specification.

In the drawings, Figure 1 is a front elevation of my improved machine; Fig. 2, a side elevation of the same; Fig. 3, a top plan view; Fig. 4, a plan-view of the nail feeder or selector; Fig. 4$^a$, a section on the line $a\ b$ of Fig. 6; Fig. 5, a vertical sectional view of the machine; Fig. 6, a similar view of the upper part considerably enlarged; Fig. 7, a horizontal section taken on the line $x\ x$ of Fig. 5; Fig. 8, a vertical section on the line $y\ y$ of Fig. 6.

Similar reference numerals in the several figures indicate similar parts.

The main frame of the machine (indicated by 1) may be constructed of one or of several parts suitably bolted together, and arranged upon the front thereof is the box support or table 2, guided upon the sides of the main frame and vertically adjustable, being provided with a rearwardly-extending bracket or lug through which passes an adjusting-screw 3 supported at its lower end in the main frame and having at its upper end a beveled pinion 4, with which latter meshes a pinion 5 on a shaft 6, provided with a hand-wheel 7, the rotation of said hand-wheel serving to raise or lower the table, as will be understood.

The frame carrying the drivers embodies the side brackets or castings 8, sliding on guides formed on the main frame and connected by a back piece or plate 9, to which is pivoted one end of a pitman 10, the other end being connected to a crank 11, formed in a shaft 12, journaled in the lower portion of the main frame. Upon said shaft is a gear 13, meshing with a gear 14 on a shaft 15, also journaled in said frame, and meshing with the gear 14 is a gear 16 on a shaft 17, with which meshes a pinion 18, loose on a countershaft 19, and upon the latter is mounted a belt-pulley 20, and a clutch of any suitable description is arranged between the shaft and pinion, being operated by a treadle 21, the operation of this portion of the device being as usual in this class of machines, the shaft 19 being continuously rotated and the clutch operating to connect the pinion therewith.

23 indicates cross-bars connecting the brackets 8 and having the T-shaped slots in their under sides, in which operate the heads of the nail-drivers 24, said drivers being adjustable in the bars, so that they may be moved by hand directly over the nail-holding jaws in the chucks, as presently described.

Arranged at the upper portion of the main frame and attached to suitable brackets thereon is a cross-piece 25 having a number of nail-channels 26 therein corresponding to the greatest number of nails adapted to be driven at once by the machine, eight being shown in the present instance, and each of these channels has an aperture 27 in the top of the cross-piece and a narrow curved passage 28, extending around to the rear and communicating with the nail-channels 29 formed between plates 30 attached to an angular slotted cross-bar 31 connected to brackets 32 on the upper portion of the frame.

The nails to be driven pass down the channels 29 and are removed from the lower end thereof and dropped into the aperture 27 by the rotary nail-selectors, one being provided for each nail-channel. These selectors each consist of a rotary disk 33 having a stud 34 operating in a suitable bearing-aperture in the cross-bar 25, and arranged on opposite sides of the disk are two vertical nail-receiving recesses 36 36$^\times$, adapted, as the selectors are rotated in the direction indicated by the arrow in Fig. 4, to carry the lowermost nails in the channel 29 around, their heads being supported on the selectors, and deposit them in the recesses 27, one nail being carried around and deposited at each half-revolution of the selecting-disk under normal circumstances; but as it is desirable to regulate the number of nails delivered to the driving devices I provide upon the upper side of each of the selectors a movable disk or gate 37 journaled upon a central stud 38 and having on one side of its periphery two recesses 39 and 40 arranged to co-operate with the recess 36, and upon the other side of said disk I provide recesses 41 and 42, the relative arrangement being such that when the recess 39 is in line with the recess 36 the other recess, 36×, is closed by the solid portion of the disk, thereby feeding but one nail at each complete revolution of the selector. When the recess 42 is in line with the other recess, 36×, in the selector, the opposite recess, 36, is closed, thereby feeding one nail at each complete revolution of the selector, but from the recess 36× thereof opposite to the one first mentioned, and when the recess 40 in the disk is in line with the recess 36 the opposite recess, 41, registers with the other recess, 36×, so that one nail will be fed at each half-rotation of the selector, and, further, the disk can be turned to close both of the recesses 36 36× and no nail will be fed during the rotation of the selector, this arrangement permitting any of the selectors to be thrown out of operation when desired.

As a means for fastening the gate in any of the positions described, I provide upon the top of the selector a pin 43, adapted to engage with any one of a series of apertures 44 in said disk, and I hold the parts in adjusted position by a cylindrical nut 45. These selectors may be operated simultaneously by any suitable means; but I prefer to arrange upon the upper side of each one of them a wrist-pin 46 passing through a suitable slot 47 in the gate 37, which pins co-operate with a suitable connecting-bar 48 common to all of them, and having its ends bent toward the rear of the machine and journaled upon wrist-pins 49 secured to the upper ends of each of two vertical shafts 50 arranged in brackets 51 on the main frame, the lower ends of said shafts having beveled pinions 52 meshing with corresponding pinions 53 on the extreme ends of shaft 15, and as said shaft 15 is given a half-revolution at each operation of the machine the shafts 51 will each be given a half-revolution and through the means just described the nail-selectors as well will be operated.

Connected to the under side of the cross-bar 25 is a series of nail-conveying chutes or tubes 60, each pivoted at the front upon a screw or pin 61 and adapted to convey the nails from the nail-channels 26 to the nail-holding chucks arranged below, said chutes having a universal movement on said pins, so that the nails will be properly guided to the chucks whether the latter are in line or otherwise, as shown.

The chucks 62 for holding the nails are provided with suitable inclined nail-channels 63 and with vertical channels 64, in which the drivers 24 operate, as shown particularly in Fig. 6, the lower end of the driver-channel having nail-holding jaws 65, pivoted at 66 and operated toward each other by springs 67, the proximate faces of the jaws being grooved for the shanks of the nails, holding them straight, so that as the nails pass down into the chucks they will be held between said jaws in position to be operated upon by the drivers when the latter are brought down.

Inasmuch as it is desirable to drive the nails simultaneously in the sides and end pieces of the box, as shown, for instance, in dotted lines in Fig. 7, I construct the chucks so that they are all interchangeable and capable of being reversed on their support, said support consisting in the present instance of two cross-bars 68 secured to brackets 69 on the main frame, and the chucks are each provided with a stud 70 fitting the space between said bars and having at its outer end a threaded extension upon which is arranged a clamping-nut 71 for holding said chucks securely in position. The proximate faces of the jaws of the chucks are grooved, as stated, so that when nails drop down into them they are maintained in upright position and sustained for a considerable distance below the head in order that they may be driven straight into the box without liability of being improperly positioned. In the drawings I have shown two outer nail-chucks arranged forward of the others, the lower ends of the nail-chutes 60 resting in the upper ends of the chutes or channels 63, thus delivering the nails properly from the feed devices. By arranging the support for the chucks between the nail-driver supports it will be seen that the chucks can be arranged to drive nails in the end pieces of the box at the same time with those in the sides and this without employing curved chutes, in which the nails might become clogged. This construction is also advantageous in connection with adjustable selectors, as it is desirable sometimes to position the nails differently on different sides or on the ends of the box, and this may therefore be accomplished by my construction.

The nails are contained in the usual tilting nail-receptacle 81 pivoted at 82 to the brackets 32, and said receptacle is provided in its bottom with the usual grooves and slots or channels 72, which register with the slots or channels 29, and the receptacle is adapted to be tilted by means of a pitman 73 pivoted to its under side and connected to a wrist-pin 74 on a gear or disk on the shaft 17, as shown particularly in Fig. 5, the construction being such that when the receptacle is in the position shown in Figs. 2, 5 and 6 in full lines the nails will gravitate toward the lower front end and their shanks will pass down through the slots, being sustained by the enlarged heads, as usual.

In order to prevent all of the nails from sliding down to the front of the receptacle when the latter is raised and thereby preventing proper movement of those in the channels or slots I arrange within said receptacle a rod 75 constituting a gate, connected to arms 89, pivoted at 76, and adapted when the receptacle is in the position in full lines to rest against studs 77, so that a comparatively small portion of the nails can fall over the bar to the front, but when the receptacle moves down to the position shown in dotted lines in Fig. 6 all of the nails in the front except those contained in the channels will fall back to the lower end of the box, the gate maintaining its vertical position, as shown, this device preventing more than a limited quantity from falling to the forward end of the box, as will be understood.

In the operation of the machine the box to which the bottom or cover is to be nailed is arranged upon the table 2, which has been adjusted to the proper height to bring the upper edge of said box close beneath the chucks, and the box is positioned rearwardly and laterally by means of a bar 78 having an adjustable stop 79 thereon and adapted to be moved backward and forward by means of screws 80, as shown particularly in Fig. 7.

Assuming the position of the disks or gates 37 on the selectors to be that shown in Fig. 4, and the previously-selected nails being in the chucks and in position to be driven, the operator releases the clutch by means of the treadle 21 and the shaft 12 makes a complete revolution, bringing down the frame carrying the drivers and driving the nails, the jaws of the chucks separating to permit the passage of the heads of the nails. At the same time the shafts 50 are given a half-revolution and by means of the wrist-pins 49 and connecting-bar 48 the selectors are given a half-revolution, carrying the nails retained in the recesses 36 36$^\times$ in the selectors around and depositing them in the channels 27, from which they pass to the holding-jaws in the chucks, as will be understood, and are ready to be driven at the next operation of the machine. The nail pan or receptacle during this operation falls to the position shown in dotted lines in Fig. 6, the gate 75 dropping back relatively and permitting the backward passage of the nails.

The construction of the selectors and the gates therefor is desirable in a machine of this description, as it sometimes happens that it is desirable in nailing boxes to drive the nails in, say, the second and fourth chucks when nailing the sides of the boxes, and the first, third and fifth when nailing the ends, and it will understood that by adjusting the gates on the selectors, as previously described, this can readily be accomplished, the selectors being adapted to feed one nail at each half-revolution, or at either the first or second half of the revolution of the selector, or they may be permitted to turn without feeding any nail at all, as the gates thereon are adjusted. The construction of this gate may be modified or otherwise constructed to accomplish the same result, and I do not desire to be confined to exactly the construction shown, as I believe myself to be the first to provide a device of this description in a nailing-machine.

The selectors are all constructed alike and as well as the chucks are interchangeable, so that the parts of the machine are few and repairs can be easily and cheaply made to the operating parts when required. It will be understood that it is not essential to give the selectors a half-rotation at each operation of the machine, but it is sufficient if the recesses are brought alternately in engagement with the ends of the nail-channels and the apertures 27, so that if they vibrated or slid or oscillated the result would be accomplished.

The particular form of clutch device controlled by the foot-lever 21 is immaterial as far as my present invention is concerned and may be such as are in use in machines of this description, or preferably such as shown in Letters Patent No. 496,431, granted to me May 2, 1893, for improvements in box-machines.

Instead of forming only two recesses in each selector any number could be employed and the operating means arranged to give them a rotation or movement equal to the distance between the proximate ones, the gates being employed to cut off any or all as desired.

I claim as my invention—

1. In a nailing-machine, the combination with a nail-support having a series of nail-channels, of a series of movable selectors co-operating therewith, each having nail-receiving recesses, and a gate on each selector for controlling the entrance of nails to said recesses, substantially as described.

2. In a nailing-machine, the combination with a nail-support having a series of nail-channels, of a series of movable selectors co-operating therewith, each having two nail-receiving recesses, and a gate on each selector for controlling the entrance of nails to said recesses, substantially as described.

3. In a nailing-machine, the combination with a nail-support, having a series of nail-channels, of a series of movable selectors co-operating therewith, each having a nail-receiving recess, and a gate on each selector for controlling the entrance to said recess, and connections for moving said selectors simultaneously, substantially as described.

4. In a nailing-machine, the combination with a support having a series of nail-channels, of a series of movable selectors co-operating therewith, each having a nail-receiving recess, and connected for simultaneous operation, a series of gates, one located on each selector, and each independently adjustable to control the entrance to the recesses, substantially as described.

5. The combination with a slotted nail-support, of a movable nail-selector having a recess arranged to co-operate with the slot in the support, and a gate on the selector for regulating the entrance of nails to the recess, substantially as described.

6. The combination with a slotted nail-support, of the nail-selector having two recesses arranged to co-operate with the slot in the support, an adjustable gate on the selector co-operating with the recesses and adapted to close either or both, substantially as described.

7. The combination with a slotted nail-support, of the rotary nail-selector having the recesses on opposite sides, the gate thereon adapted to close either or both of the recesses and means for rotating said selector a half-rotation intermittingly, substantially as described.

8. The combination with the slotted nail-support, of the nail-selector having the central stud, and the recesses in opposite sides, the gate or disk having two recesses on each side of the center, and means for securing said gate in adjusted position on the selector, substantially as described.

9. The combination with the slotted nail-support, of a series of rotary selectors, each having a recess, and an adjustable gate, the wrist-pins on said selectors, and a connecting-rod engaging said wrist-pins and operating to rotate the selectors, substantially as described.

10. The combination with the slotted nail-support, of a series of rotary selectors having recesses for co-operating with the slots, the wrist-pins on the selectors, the connecting-bar engaging the pins, and the two shafts, each having a wrist-pin engaging one end of said bar, substantially as described.

11. The combination with the supporting-table, the movable frame having the two driver-supports, drivers laterally adjustable in said supports, of the chuck-support arranged between and below the driver-supports, and the reversible and interchangeable nail-chucks, each having nail-holding jaws, a channel for the driver and a channel for the nail, and securing devices for fastening the said chucks to their supports, substantially as described.

12. The combination with the supporting-table, the movable frame having the two driver-supports, and the drivers supported and laterally adjustable on said supports, of the nail-chuck support arranged between and below said drivers, the reversible nail-chucks secured to said support and each having nail-channels and driver-channels with jaws at the bottom of the latter, the nail-chutes pivoted loosely at their upper ends between the driver-supports, and nail-feeding devices for delivering nails into the chutes, substantially as described.

13. The combination with the supporting-table, the movable frame and two series of laterally-adjustable drivers thereon, of the nail-chuck support arranged below and between said drivers, the reversible nail-chucks connected to opposite sides of said support, the nail-chutes loosely pivoted between the drivers, and the nail-selectors, one for each chute having controlling-gates, substantially as described.

14. In a nailing-machine the combination with the nail-support having nail-channels and the pivoted nail-receptacle having corresponding channels, of the pivoted and swinging narrow cross-bar arranged in the receptacle in proximity to but above the bottom thereof and in rear of the front, and a stop for arresting its forward movement when the receptacle is tilted up, whereby the nails in the channels in the receptacle may move down when the receptacle is tilted up and the mass of nails in the rear of the bar will be arrested a small quantity falling over the bar, substantially as described.

15. In a nailing-machine, the combination with the main frame, the driver-supports and drivers, the chuck-supports between them, and the nail-chucks and chutes, of the nail-support having the nail-channels, the rotary selectors having recesses in the sides, and the wrist-pins, the connecting-bar having the rearwardly-extending ends, and engaging the wrist-pins, and the vertical shafts on the main frame and the wrist-pins thereon engaging the ends of the connecting-bar, substantially as described.

HENRY W. MORGAN.

Witnesses:
F. F. CHURCH,
G. A. RODA.